United States Patent
Gowda et al.

(10) Patent No.: US 11,397,907 B1
(45) Date of Patent: Jul. 26, 2022

(54) CENTRALIZED ENTERPRISE INTEGRATION AND SERVICES MONITORING PORTAL

(71) Applicant: EMC IP Holding Company LLC, Hopkinton, MA (US)

(72) Inventors: Gnanesh Gowda, Westborough, MA (US); Sharath Yathiraj, Shrewsbury, MA (US); Hung T. Dinh, Austin, TX (US); Praveen Yeruva, South Grafton, MA (US); Apeksha S, Mysore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 407 days.

(21) Appl. No.: 15/881,369

(22) Filed: Jan. 26, 2018

(51) Int. Cl.
*G06Q 10/06* (2012.01)
*G06F 9/455* (2018.01)

(52) U.S. Cl.
CPC ..... *G06Q 10/0633* (2013.01); *G06F 9/45558* (2013.01)

(58) Field of Classification Search
None
See application file for complete search history.

(56) References Cited

U.S. PATENT DOCUMENTS 7,272,660 B1 * 9/2007 Powers .................. G06Q 30/06 709/231
2009/0018996 A1 * 1/2009 Hunt .................... G06F 16/2264
2014/0040182 A1 * 2/2014 Gilder ................... G06F 16/256 707/602
2018/0089290 A1 * 3/2018 Haggie ............... G06F 16/2255

FOREIGN PATENT DOCUMENTS

JP 5525673 B2 * 6/2014 ......... G06F 16/2465

OTHER PUBLICATIONS

Paul Hershey, SOA Monitoring for Enterprise Computing Systems, 2007, 11th IEEE International Enterprise Distributed Object Computing Conference (Year: 2007).*
IBM Corporation, "IBM Cloud Application Performance Management," https://www.ibm.com/us-en/marketplace/application-performance-management, Jan. 24, 2018, 1 page.
Oracle Technology Network, "Middleware Management," http://www.oracle.com/technetwork/oem/soa-mgmt/index.html?ssSourceSiteId=ocomen, Jan. 24, 2018, 3 pages.

* cited by examiner

Primary Examiner — Jerry O'Connor
Assistant Examiner — Matthew H Divelbiss
(74) Attorney, Agent, or Firm — Ryan, Mason & Lewis, LLP (57) ABSTRACT

Techniques are provided for centralized enterprise integration and services monitoring in computing environments. For example, a system comprises one or more processors operatively coupled to one or more memories to form a monitoring portal system, wherein the monitoring portal framework is configured to perform steps of: providing one or more graphical user interfaces; and enabling centralized enterprise integration and services monitoring through the one or more graphical user interfaces.

20 Claims, 5 Drawing Sheets

CENTRALIZED ENTERPRISE INTEGRATION AND SERVICES MONITORING PORTAL

FIELD

The field relates generally to computing environments, and more particularly to techniques for providing centralized enterprise integration and services monitoring in such computing environments.

BACKGROUND

Tracking integrated enterprise, real-time service transactions, monitoring systems, forecast capacity usages, etc., across multiple heterogeneous information technology (IT) systems associated with an enterprise is important in today's fast-moving business climate in order to maintain advantages over competitors. To achieve such advantages, it would be desirable to be able to track data across an array of systems and applications used to monitor transactions and support requests across various databases. However, with existing systems, users have to check multiple locations to track a transaction from one endpoint to the next across an enterprise.

SUMMARY

Embodiments of the invention provide techniques for centralized enterprise integration and services monitoring in computing environments.

For example, in one illustrative embodiment, a system comprises one or more processors operatively coupled to one or more memories to form a monitoring portal framework, wherein the monitoring portal system is configured to perform steps of: providing one or more graphical user interfaces; and enabling centralized enterprise integration and services monitoring through the one or more graphical user interfaces.

Advantageously, in one or more illustrative embodiments, the centralized enterprise integration and services monitoring portal provides visibility that enables, for example, a sales representative insight into the status of a given customer order to keep track of its movement across the many heterogeneous systems and their interfaces.

These and other features and advantages of the invention will become more readily apparent from the accompanying drawings and the following description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as "computing network environments." Environments that implement multiple cloud platforms are referred to as multi-cloud computing environments. As mentioned above, a multi-cloud computing environment employed by an enterprise may comprise a combination of private and public clouds. The term "enterprise" as used herein is intended to be broadly construed, and may comprise, for example, one or more businesses, one or more corporations or any other one or more entities, groups, or organizations. An "entity" as illustratively used herein may be a person or system.

As will be further explained herein, illustrative embodiments provide a framework that pulls together all integrated transaction data and their supported systems into a centralized view where business and support teams can see real-time transactions, operational metrics, monitoring systems, estimate capacity usages, etc., across multiple heterogeneous IT systems in a comprehensive dashboard (portal) that can service both executives and technical audiences. Examples of multiple heterogeneous IT systems that can be centrally monitored in accordance with illustrative embodiments include, but are not limited to, Enterprise Resource Planning (ERP) systems, Customer Relationship Management (CRM) systems, and Human Resources (HR) systems.

More particularly, in illustrative embodiments, a centralized enterprise integration and services monitoring portal system is built using an open source, virtualized, third platform technologies and enables the following features/advantages: micro services based approach; light weight and easily customizable; easy plug & play systems using one or more application programming interfaces (APIs); transaction search and save functionalities; data analytics and statistics functionalities; dashboard and reporting with any historic data; proactive service monitoring and alert functionalities; systems monitoring; chat and service integration; and mobile enabled functionalities.

Figure 1:
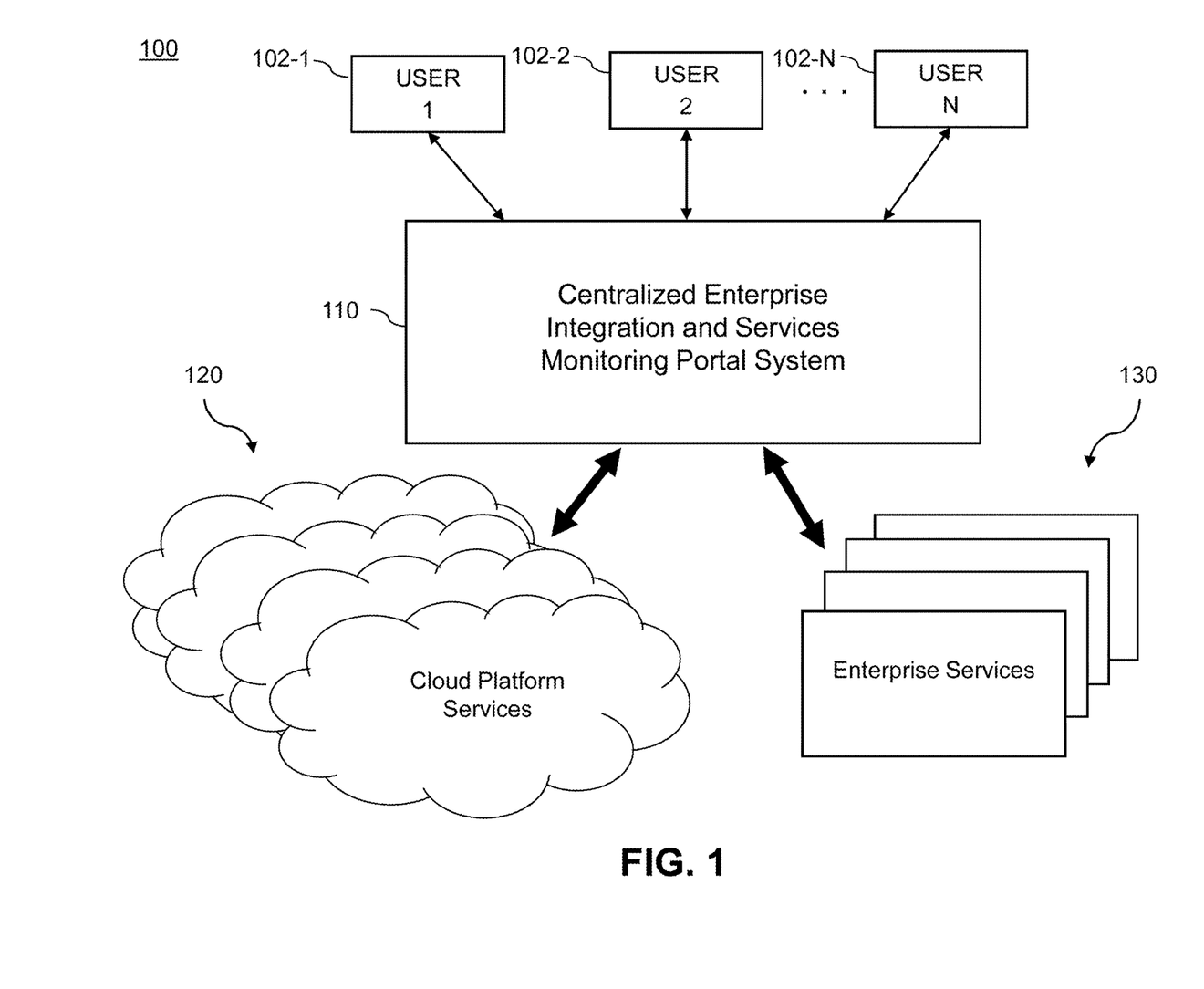
FIG. 1 illustrates an information processing system implementing a centralized enterprise integration and services monitoring framework, according to an illustrative embodiment.

FIG. 1 illustrates an information processing system implementing a centralized enterprise integration and services monitoring framework, according to an illustrative embodiment. As shown in information processing system 100, a plurality of users (USER 1, USER 2, . . . USER N) 102-1, 102-2, . . . 102-N are operatively coupled (e.g., via their respective computing devices) to a centralized enterprise integration and services monitoring portal system 110. The monitoring portal system 110 accumulates transaction data and other data from multiple heterogeneous IT systems associated with an enterprise and provides a centralized view for the users 102-1, 102-2, . . . 102-N through one or more graphical user interfaces. The transaction data and other data is accumulated by the monitoring portal system 110 from cloud platform (public) services 120 and enterprise (private) services 130 that are executed on the heterogeneous IT systems associated with an enterprise. The services 120 and 130 are operatively coupled to monitoring portal system 110.

Figure 2:
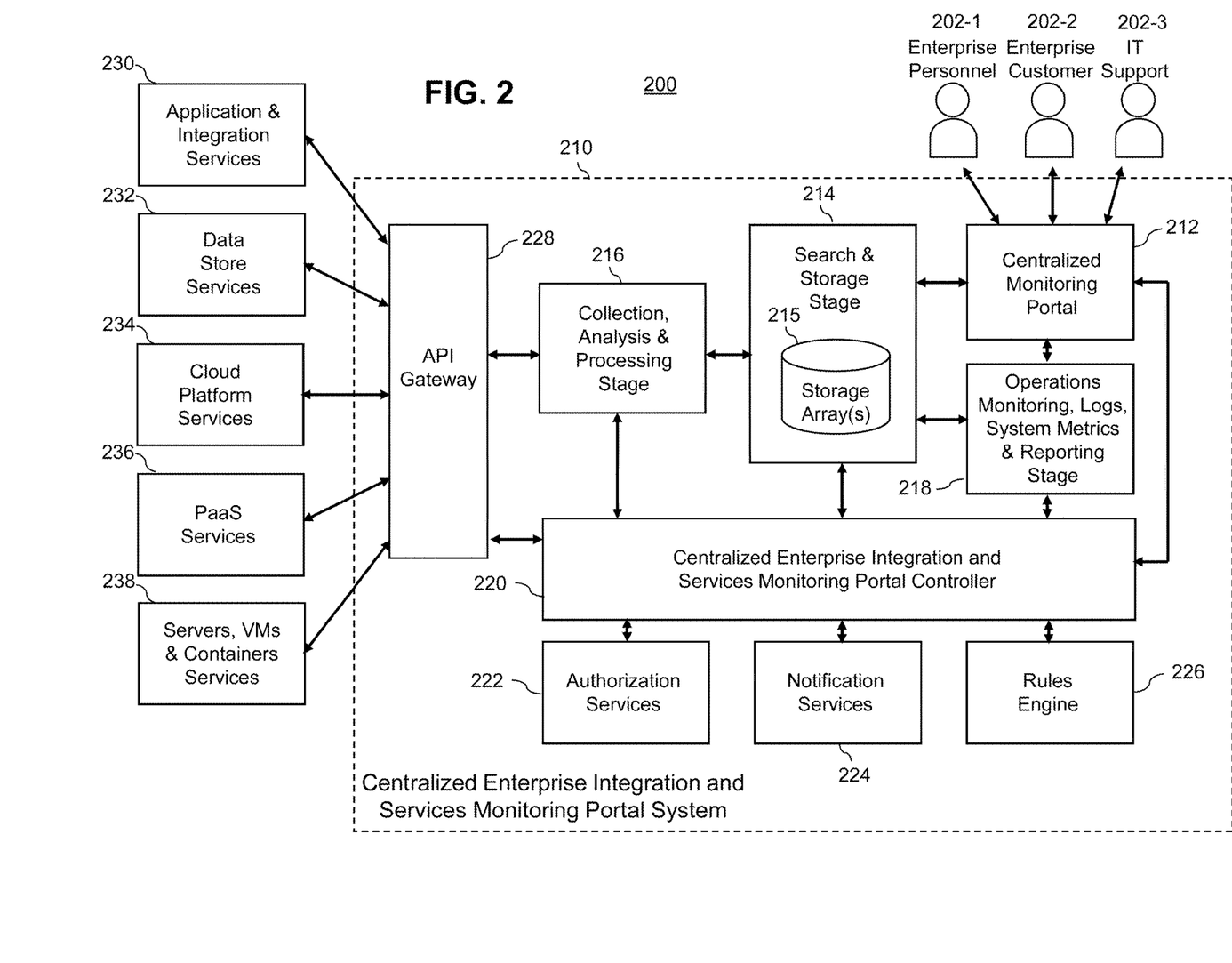
FIG. 2 illustrates a more detailed exemplary architecture for a centralized enterprise integration and services monitoring framework, according to an illustrative embodiment.

FIG. 2 illustrates a more detailed exemplary architecture for a centralized enterprise integration and services monitoring framework, according to an illustrative embodiment. More particularly, information processing system 200 illustrates examples of users 102-1, 102-2, . . . 102-N and cloud platform services 120 and enterprise services 130 from FIG. 1, as well as further details of the centralized enterprise integration and services monitoring portal system 110.

As shown, users of the centralized enterprise integration and services monitoring portal system 210 may include, but are not limited to, enterprise personnel 202-1, enterprise customer(s) 202-2, and IT support 202-3. Application & integration services 230, data store services 232, cloud platform services 234, Platform-as-a-Service (PaaS) services 236, and servers, virtual machines (VMs) & containers 238 are considered examples of cloud platform services 120 and/or enterprise services 130.

Further, block 210 in FIG. 2 illustrates further details of a centralized enterprise integration and services monitoring portal system (e.g., further details of system 110 in FIG. 1). As shown, system 210 comprises: a centralized monitoring portal 212; a search & storage stage 214; a collection, analysis & processing stage 216; an operations monitoring, logs, system metrics & reporting stage 218; authorization services 222, notification services 224; a rules engine 226; and an application programming interface (API) gateway 228, each operatively coupled to a centralized enterprise integration and services monitoring portal controller 220.

Thus, in an illustrative operational flow example, transactions that are generated in accordance with one or more of application & integration services 230, data store services 232, cloud platform services 234, PaaS services 236, and servers, VMs & containers 238, are provided to collection, analysis & processing stage 216 through API gateway 228. The transactions can be provided in a push mode and/or a pull mode. The transaction data is provided to the search & store stage 214. The data is stored in one or more storage arrays 215. The stored data may comprise raw data collected directly from the cloud or enterprise services and/or data that is analyzed/processed by enterprise middleware (e.g., data filtering algorithm, data normalization algorithm, etc.) in stage 216. Operations monitoring, logs, system metrics & reporting stage 218 is configured to further analyze the stored data. By way of example only, statistical analysis algorithms can be run on the data to generate customized reports and logs that are of respective interest to users such as enterprise personnel 202-1, enterprise customer(s) 202-2, and IT support 202-3. The users are able to view the stored data and/or the results of the operations monitoring, logs, system metrics & reporting stage 218 through the centralized monitoring portal 212. The portal 212 provides one or more graphical user interfaces that enable centralized enterprise integration and services monitoring for the users.

More particularly, in one or more illustrative embodiments, the portal 212 enables users access to view: one or more real-time transactions from across multiple heterogeneous systems associated with a given enterprise; one or more operational metrics from across multiple heterogeneous systems associated with a given enterprise; one or more monitoring systems from across multiple heterogeneous systems associated with a given enterprise; one or more estimated capacity usages from across multiple heterogeneous systems associated with a given enterprise; and monitoring data associated with one or more cloud computing platform services.

Authorization services 222 are configured to provide authentication of the users before allowing them to access the portal 212 and provide transaction queries (e.g., single sign on). Notification services 224 are configured to provide messages (emails, alerts, etc.) to users based on their searches and based on the status of any given transaction of interest. Rules engine 226 enables system administrators to load rules that the system 210 follows/executes with regard to various system operations, e.g., authorization, notification, storage, search, analysis, etc.

The centralized enterprise integration and services monitoring portal controller 220 is configured to control the operations of each of the other components of system 210. In one illustrative embodiment, the controller 220 loads from memory and executes software instructions that are configured to provide the functionalities described herein. The controller can also be in the form of software code which calls other software code that executes the functionalities described herein. In some embodiments, the controller is a combination of hardware and software components. Examples of processing platforms that are able to implement the components shown in FIGS. 1 and 2 are described below in the context of FIGS. 4 and 5.

Given the above-described illustrative embodiments of the centralized enterprise integration and services monitoring framework, an illustrative use case is now described from the perspective of companies that are merging and have a need to enable customers of both companies, and internal personnel of both companies, to access transaction data across the newly formed enterprise.

Tracking business and service transactions across multiple IT systems is important in today's fast-moving business climate. Being able to track them across two major IT companies that recently merged to form one of the largest technology companies in the world is absolutely vital. Accordingly, the centralized enterprise integration and services monitoring framework (e.g., FIGS. 1 and 2) provides a visualization tool that lets business and IT support teams monitor transactions on a single dashboard. This is a critical step in the integration of merging companies. The monitoring framework brings together all transaction data into a single place where business and support people can see transactions across multiple systems in a comprehensive dashboard.

In one embodiment, the monitoring framework provides access via single sign on, allowing consolidation of different tracking applications that existed in the two companies prior to merging into one application.

Further, assume that each of the companies prior to merger had amassed an array of systems and applications used to monitor transactions and support requests across various databases. Prior to the monitoring framework described herein, business and support users would have to check multiple locations to track a transaction from one phase to the next across the organization.

For example, prior to the monitoring framework, IT personnel might get a call from a business user asking for insights into what is happening with a given sales order. Maybe they already confirmed the transaction data had been processed from the SAP® (SAP America Inc., Newtown Square, Pa.) database but did not know if it ever reached TradeSphere® (Livingston International, Chicago, Ill.), an open-source application used to ensure transactions conform to trade compliance regulations. Further, the business user may be looking for the transaction's status in Salesforce.com® (Salesforce.com Inc., San Francisco, Calif.), a third-party customer relationship management (CRM) application.

With the monitoring framework described herein, such sales representatives, as well as numerous other business users and support providers, can enter the transaction number (into portal 212) and find out (search stage 214) exactly where their sales order, service request, security enablement process, or manufacturing invoice is in the process. The transaction data is received by the system (210) from the various cloud and enterprise services (230 through 238).

In one illustrative embodiment, the centralized enterprise integration and services monitoring framework (e.g., FIGS. 1 and 2) is implemented on Pivotal Spring Framework® (Pivotal Software, Palo Alto, Calif.), which is an open-source application development framework. The search stage (214) includes the enterprise search engine ElasticSearch® (Elasticsearch, Mountain View, Calif.). The monitoring framework, in one illustrative embodiment, may be implemented with Google Material Design® (Google, Mountain View, Calif.) to maximize user experience for visual data presentation; Pivotal Cloud Foundry and Pivotal Gemfire® (Pivotal Software, Palo Alto, Calif.); AngularJS, D3JS & JQuery; Spring Boot and Spring Cloud Microservices® (Pivotal Software, Palo Alto, Calif.); and Slack® (Slack Technologies, Vancouver, Canada).

The result is a single dashboard that is customizable and offers better insights into integrated transaction data, which is also easily maintained. Users can search for transactions faster and see their status all in one place. Replacing a plurality of tracking applications with one results in cost and resource savings.

Figure 3:
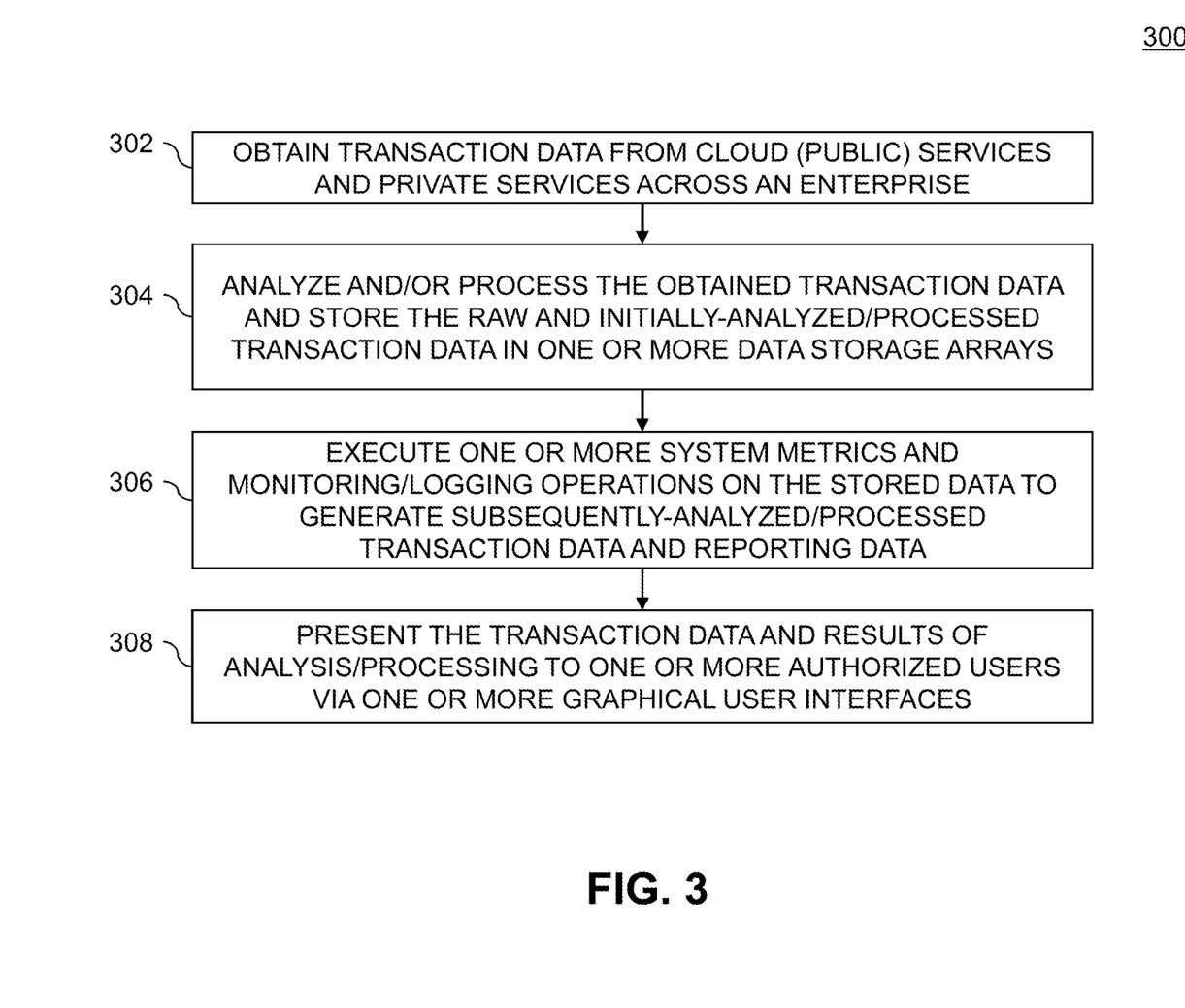
FIG. 3 illustrates a methodology for providing centralized enterprise integration and services monitoring, according to an illustrative embodiment.

FIG. 3 illustrates a methodology 300 for providing centralized enterprise integration and services monitoring, according to an illustrative embodiment.

Step 302 obtains transaction data from cloud (public) services and private services across heterogeneous IT systems of a given enterprise.

Step 304 analyzes and/or processes the obtained transaction data and stores the raw and initially-analyzed/processed transaction data in one or more data storage arrays.

Step 306 executes one or more system metrics and monitoring/logging operations on the stored data to generate subsequently-analyzed/processed transaction data and reporting data.

Step 308 presents the transaction data and results of analysis/processing to one or more authorized users via one or more graphical user interfaces.

As noted above, at least portions of the information processing systems 100 and 200 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components or portions thereof are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of information processing systems in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container LXC. The containers may run on virtual machines in a multi-tenant environment, although other arrangements are possible. The containers may be utilized to implement a variety of different types of functionality within the systems 100 and 200. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of systems 100 and 200, these platforms may also be used to implement at least portions of other information processing systems in other embodiments.

Figure 4:
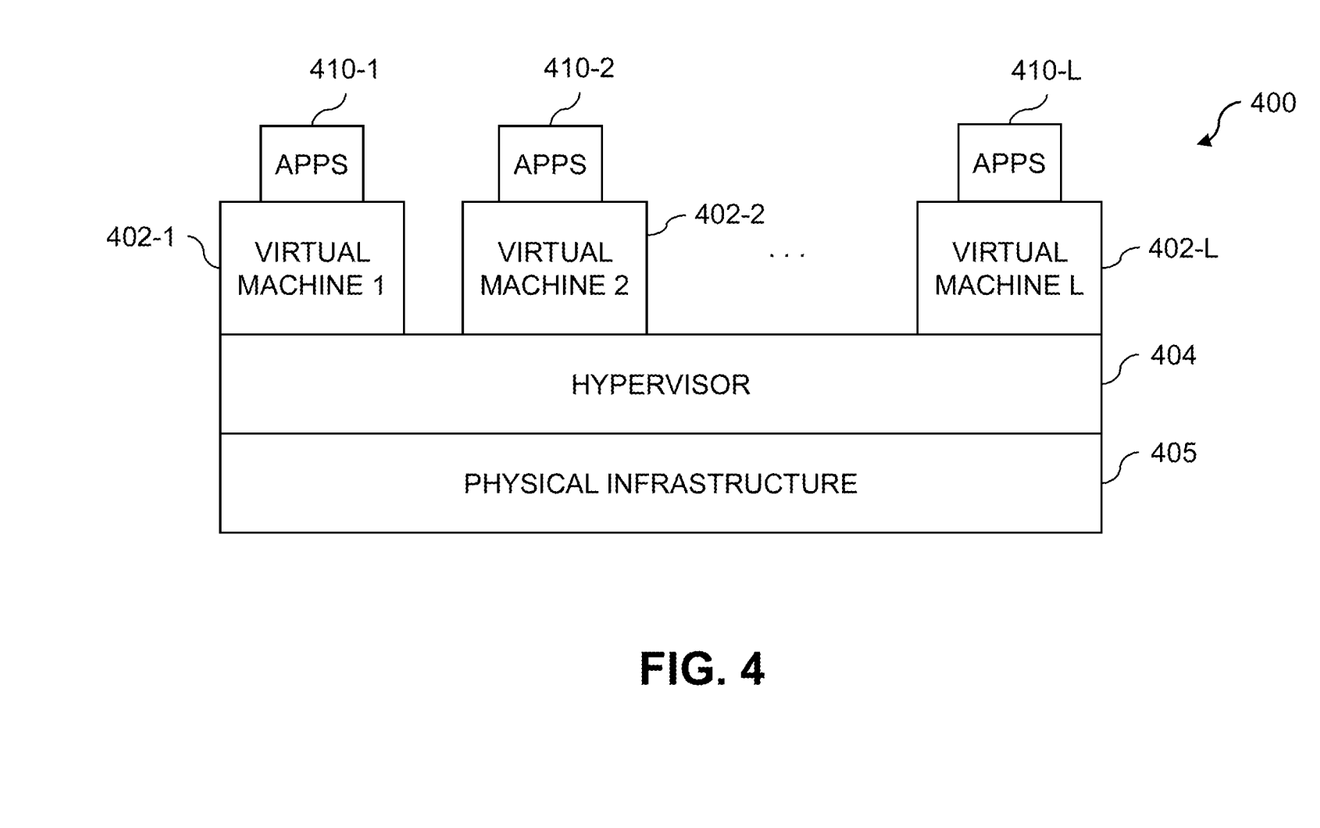
FIGS. 4 and 5 illustrate examples of processing platforms that may be used to implement a centralized enterprise integration and services monitoring framework, according to illustrative embodiments.
Figure 5:
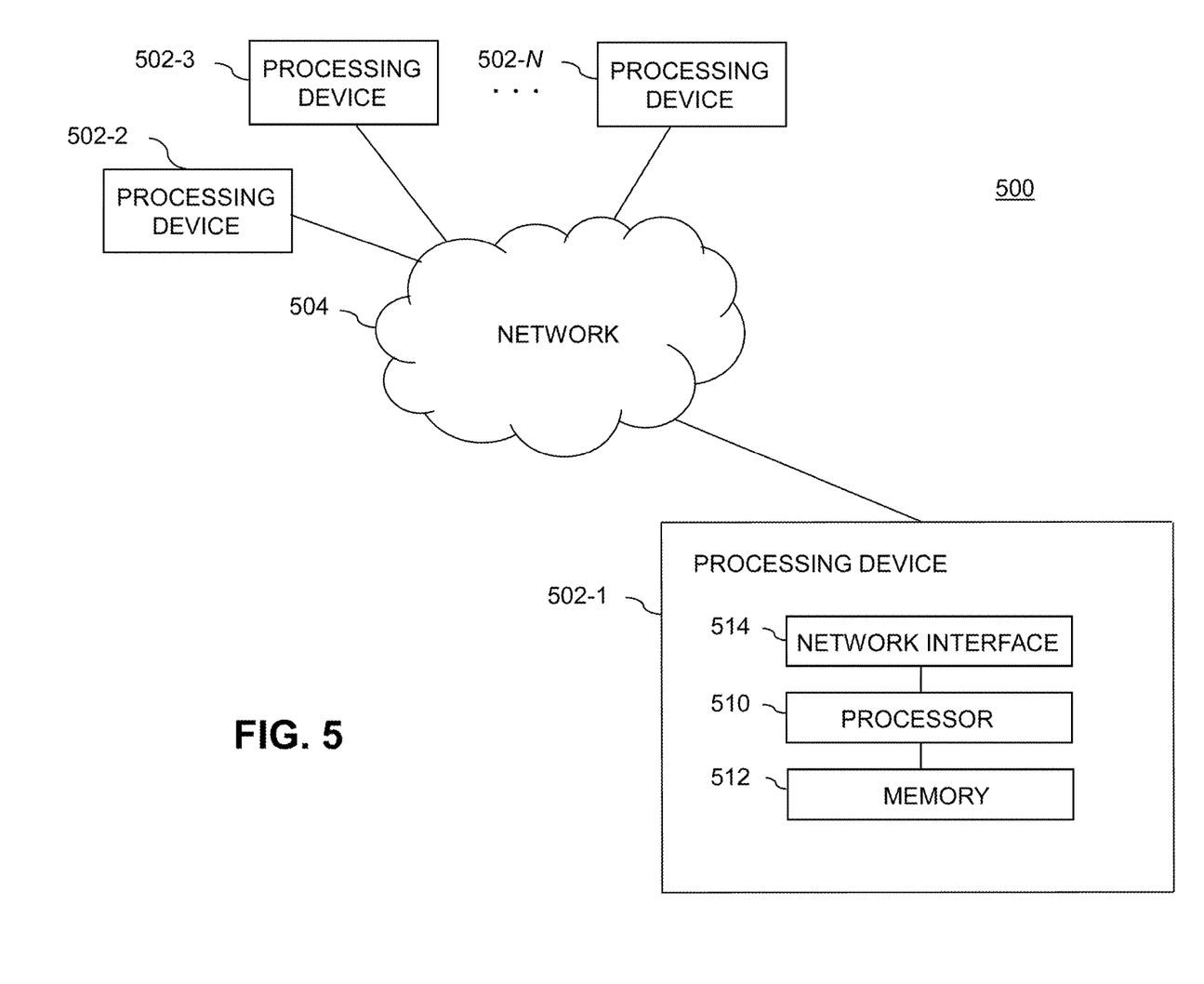

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . , 402-L implemented using a hypervisor 404. The hypervisor 404 runs on physical infrastructure 405. The cloud infrastructure 400 further comprises sets of applications 410-1, 410-2, . . . , 410-L running on respective ones of the virtual machines 402-1, 402-2, . . . , 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the systems 100 and 200.

An example of a commercially available hypervisor platform that may be used to implement hypervisor 404 and possibly other portions of the information processing systems 100 and 200 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of systems 100 and 200 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of systems 100 and 200, and includes a plurality of processing devices, denoted 502-1, 502-2, 502-3, . . . , 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and systems 100 and 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing systems 100 and 200. Such components can communicate with other elements of the information processing systems 100 and 200 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the information processing systems 100 and 200 are illustratively implemented in the form of software running on one or more processing devices.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A system, comprising:
one or more memories; and
one or more processors operatively coupled to the one or more memories to form a single monitoring portal system for a given enterprise, wherein the single monitoring portal system is configured to:
centrally monitor at least two heterogeneous information technology service systems operatively coupled to the single monitoring portal system via one or more communication networks and respectively associated with at least two entities that form at least part of the given enterprise;

wherein the central monitoring is further configured to: (i) obtain transaction data from a plurality of heterogeneous services across the at least two heterogeneous information technology service systems; and (ii) analyze the obtained transaction data and store the analyzed transaction data in one or more data storage arrays associated with the single monitoring portal system, wherein the analysis comprises executing, on the obtained transaction data, one or more of a data filtering algorithm, a data normalization algorithm, a system metric computation, and a statistical analysis;

enable at least one user to access each of the at least two heterogeneous information technology service systems through the single monitoring portal system using a single sign on operation;

receive a query from the at least one user requesting status of at least a portion of the analyzed transaction data, the query being directed to one or more transactions executed at least partially on (i) a first one of the at least two heterogenous information technology service systems operated by a first one of the at least two entities that form at least part of the given enterprise and at least partially on (ii) at least a second one of the at least two heterogeneous information technology service systems operated by a second one of the at least two entities that form at least part of the given enterprise; and send a status of the analyzed transaction data to the at least one user in response to the received query, the status of the analyzed transaction data comprising a consolidation of information from a first set of one or more tracking applications implemented by (i) the first one of the at least two heterogenous information technology service systems operated by the first one of the at least two entities that form at least part of the given enterprise and a second set of one or more tracking applications implemented by (ii) at least the second one of the at least two heterogeneous information technology service systems operated by the second one of the at least two entities that form at least part of the given enterprise;

wherein the single monitoring portal system comprises:
a centralized enterprise integration and services monitoring portal controller;
a collection, analysis and processing stage coupled to the centralized enterprise integration and services monitoring portal controller, the collection, analysis and processing stage being configured to receive the obtained transaction data from the plurality of heterogeneous services across the at least two heterogeneous information technology service systems via an application programming interface gateway, the application programming interface gateway being coupled to the centralized enterprise integration and services monitoring portal controller;
a search and storage stage coupled to the centralized enterprise integration and services monitoring portal controller and the collection, analysis and processing stage, the search and storage stage receiving the obtained transaction data from the collection, analysis and processing stage and storing the obtained transaction data in the one or more data storage arrays, wherein the obtained transaction data comprises at least one of: raw transaction data collected from the plurality of heterogeneous services across the at least two heterogeneous information technology service systems; and the analyzed transaction data, the analyzed transaction data being processed utilizing enterprise middleware of the collection, analysis and processing stage;
an operations monitoring, logs, system metrics and reporting stage coupled to the search and storage stage and the centralized enterprise integration and services monitoring portal controller, the operations monitoring, logs, system metrics and reporting stage being configured to further analyze the obtained transaction data stored in the one or more data storage arrays to generate at least one of reports and logs that are customized for the at least one user;
a centralized monitoring portal coupled to the operations monitoring, logs, system metrics and reporting stage, the centralized monitoring portal comprising one or more graphical user interfaces enabling the at least one user to view the obtained transaction data, the analyzed transaction data, and the generated at least one of reports and logs customized for the at least one user;
authorization services coupled to the centralized enterprise integration and services monitoring portal controller, the authorization services being configured to provide authentication of said at least one user prior to providing the at least one user access to the centralized monitoring portal;
notification services coupled to the centralized enterprise integration and services monitoring portal controller, the notification services being configured to provide one or more messages to the at least one user in response to the received query; and
a rules engine coupled to the centralized enterprise integration and services monitoring portal controller the rules engine being configured to enforce one or more rules for the authorization services and the notification services.

2. The system of claim 1, wherein the one or more graphical user interfaces of the centralized monitoring portal are configured to present to the at least one user one or more real-time transactions.

3. The system of claim 1, wherein the one or more graphical user interfaces of the centralized monitoring portal are configured to present to the at least one user one or more operational metrics.

4. The system of claim 1, wherein the one or more graphical user interfaces of the centralized monitoring portal are configured to present to the at least one user one or more monitoring systems.

5. The system of claim 1, wherein the one or more graphical user interfaces of the centralized monitoring portal are configured to present to the at least one user one or more estimated capacity usages.

6. The system of claim 1, wherein the one or more graphical user interfaces of the centralized monitoring portal are configured to present to the at least one user monitoring data associated with one or more cloud computing platform services.

7. The system of claim 1, wherein the one or more graphical user interfaces of the centralized monitoring portal are configured to present the transaction data and the analyzed transaction data to one or more authorized users.

8. A method comprising:
centrally monitoring at least two heterogeneous information technology service systems operatively coupled to a single monitoring portal system via one or more communication networks and respectively associated with at least two entities that form at least part of a given enterprise;

wherein the central monitoring comprises:
(i) obtaining transaction data from a plurality of heterogeneous services across the at least two heterogeneous information technology service systems; and
(ii) analyzing the obtained transaction data and store the analyzed transaction data in one or more data storage arrays associated with the single monitoring portal system, wherein the analysis comprises executing, on the obtained transaction data, one or more of a data filtering algorithm, a data normalization algorithm, a system metric computation, and a statistical analysis;

enabling at least one user to access each of the at least two heterogeneous information technology service systems through the single monitoring portal system using a single sign on operation;

receiving a query from the at least one user requesting status of at least a portion of the analyzed transaction data, the query being directed to one or more transactions executed at least partially on (i) a first one of the at least two heterogenous information technology service systems operated by a first one of the at least two entities that form at least part of the given enterprise and at least partially on (ii) at least a second one of the at least two heterogeneous information technology service systems operated by a second one of the at least two entities that form at least part of the given enterprise; and sending a status of the analyzed transaction data to the at least one user in response to the received query, the status of the analyzed transaction data comprising a consolidation of information from a first set of one or more tracking applications implemented by (i) the first one of the at least two heterogenous information technology service systems operated by the first one of the at least two entities that form at least part of the given enterprise and a second set of one or more tracking applications implemented by (ii) at least the second one of the at least two heterogeneous information technology service systems operated by the second one of the at least two entities that form at least part of the given enterprise;

wherein the steps are performed by one or more processors operatively coupled to one or more memories to form the single monitoring portal system for the given enterprise; and wherein the single monitoring portal system comprises:
a centralized enterprise integration and services monitoring portal controller;
a collection, analysis and processing stage coupled to the centralized enterprise integration and services monitoring portal controller, the collection, analysis and processing stage being configured to receive the obtained transaction data from the plurality of heterogeneous services across the at least two heterogeneous information technology service systems via an application programming interface gateway, the application programming interface gateway being coupled to the centralized enterprise integration and services monitoring portal controller;
a search and storage stage coupled to the centralized enterprise integration and services monitoring portal controller and the collection, analysis and processing stage, the search and storage stage receiving the obtained transaction data from the collection, analysis and processing stage and storing the obtained transaction data in the one or more data storage arrays, wherein the obtained transaction data comprises at least one of: raw transaction data collected from the plurality of heterogeneous services across the at least two heterogeneous information technology service systems; and the analyzed transaction data, the analyzed transaction data being processed utilizing enterprise middleware of the collection, analysis and processing stage;
an operations monitoring, logs, system metrics and reporting stage coupled to the search and storage stage and the centralized enterprise integration and services monitoring portal controller, the operations monitoring, logs, system metrics and reporting stage being configured to further analyze the obtained data stored in the one or more data storage arrays to generate at least one of reports and logs that are customized for the at least one user;
a centralized monitoring portal coupled to the operations monitoring, logs, system metrics and reporting stage, the centralized monitoring portal comprising one or more graphical user interfaces enabling the at least one user to view the obtained transaction data, the analyzed transaction data, and the generated at least one of reports and logs customized for the at least one user;
authorization services coupled to the centralized enterprise integration and services monitoring portal controller, the authorization services being configured to provide authentication of said at least one user prior to providing the at least one user access to the centralized monitoring portal;
notification services coupled to the centralized enterprise integration and services monitoring portal controller, the notification services being configured to provide one or more messages to the at least one user in response to the received query; and
a rules engine coupled to the centralized enterprise integration and services monitoring portal controller the rules engine being configured to enforce one or more rules for the authorization services and the notification services.

9. The method of claim 8, further comprising presenting to the at least one user one or more real-time transactions utilizing the one or more graphical user interfaces of the centralized monitoring portal.

10. The method of claim 8, further comprising presenting to the at least one user one or more operational metrics utilizing the one or more graphical user interfaces of the centralized monitoring portal.

11. The method of claim 8, further comprising presenting to the at least one user one or more monitoring systems utilizing the one or more graphical user interfaces of the centralized monitoring portal.

12. The method of claim 8, further comprising presenting to the at least one user one or more estimated capacity usages utilizing the one or more graphical user interfaces of the centralized monitoring portal.

13. The method of claim 8, further comprising presenting to the at least one user monitoring data associated with one or more cloud computing platform services utilizing the one or more graphical user interfaces of the centralized monitoring portal.

14. The method of claim 8, further comprising presenting the transaction data and the analyzed transaction data to one or more authorized users via the one or more graphical user interfaces of the centralized monitoring portal.

15. An article of manufacture comprising a non-transitory processor-readable storage medium having stored therein program code of one or more software programs, wherein the program code, when executed by one or more processing devices operatively coupled to the one or more memories to form a single monitoring portal system for a given enterprise, causes said single monitoring portal system to:
centrally monitor at least two heterogeneous information technology service systems operatively coupled to the single monitoring portal system via one or more communication networks and respectively associated with at least two entities that form at least part of the given enterprise;
wherein the centrally monitoring comprises:
(i) obtaining transaction data from a plurality of heterogeneous services across the at least two heterogeneous information technology service systems; and
(ii) analyzing the obtained transaction data and store the analyzed transaction data in one or more data storage arrays associated with the single monitoring portal system, wherein the analysis comprises executing, on the obtained transaction data, one or more of a data filtering algorithm, a data normalization algorithm, a system metric computation, and a statistical analysis;
enable at least one user to access each of the at least two heterogeneous information technology service systems through the single monitoring portal system using a single sign on operation;
receive a query from the at least one user requesting status of at least a portion of the analyzed transaction data, the query being directed to one or more transactions executed at least partially on (i) a first one of the at least two heterogenous information technology service systems operated by a first one of the at least two entities that form at least part of the given enterprise and at least partially on (ii) at least a second one of the at least two heterogeneous information technology service systems operated by a second one of the at least two entities that form at least part of the given enterprise; and
send a status of the analyzed transaction data to the at least one user in response to the received query, the status of the analyzed transaction data comprising a consolidation of information from a first set of one or more tracking applications implemented by (i) the first one of the at least two heterogenous information technology service systems operated by the first one of the at least two entities that form at least part of the given enterprise and a second set of one or more tracking applications implemented by (ii) at least the second one of the at least two heterogeneous information technology service systems operated by the second one of the at least two entities that form at least part of the given enterprise;
wherein the single monitoring portal system comprises:
a centralized enterprise integration and services monitoring portal controller;
a collection, analysis and processing stage coupled to the centralized enterprise integration and services monitoring portal controller, the collection, analysis and processing stage being configured to receive the obtained transaction data from the plurality of heterogeneous services across the at least two heterogeneous information technology service systems via an application programming interface gateway, the application programming interface gateway being coupled to the centralized enterprise integration and services monitoring portal controller;
a search and storage stage coupled to the centralized enterprise integration and services monitoring portal controller and the collection, analysis and processing stage, the search and storage stage receiving the obtained transaction data from the collection, analysis and processing stage and storing the obtained transaction data in the one or more data storage arrays, wherein the obtained transaction data comprises at least one of: raw transaction data collected from the plurality of heterogeneous services across the at least two heterogeneous information technology service systems; and the analyzed transaction data, the analyzed transaction data being processed utilizing enterprise middleware of the collection, analysis and processing stage;
an operations monitoring, logs, system metrics and reporting stage coupled to the search and storage stage and the centralized enterprise integration and services monitoring portal controller, the operations monitoring, logs, system metrics and reporting stage being configured to further analyze the obtained data stored in the one or more data storage arrays to generate at least one of reports and logs that are customized for the at least one user;
a centralized monitoring portal coupled to the operations monitoring, logs, system metrics and reporting stage, the centralized monitoring portal comprising one or more graphical user interfaces enabling the at least one user to view the obtained transaction data, the analyzed transaction data, and the generated at least one of reports and logs customized for the at least one user;
authorization services coupled to the centralized enterprise integration and services monitoring portal controller, the authorization services being configured to provide authentication of said at least one user prior to providing the at least one user access to the centralized monitoring portal;
notification services coupled to the centralized enterprise integration and services monitoring portal controller, the notification services being configured to provide one or more messages to the at least one user in response to the received query; and
a rules engine coupled to the centralized enterprise integration and services monitoring portal controller the rules engine being configured to enforce one or more rules for the authorization services and the notification services.

16. The article of manufacture of claim 15, wherein the one or more graphical user interfaces of the centralized monitoring portal are configured to present to the at least one user one or more real-time transactions.

17. The article of manufacture of claim 15, wherein the one or more graphical user interfaces of the centralized monitoring portal are configured to present to the at least one user one or more operational metrics.

18. The article of manufacture of claim 15, wherein the one or more graphical user interfaces of the centralized monitoring portal are configured to present to the at least one user one or more monitoring systems.

19. The article of manufacture of claim 15, wherein the one or more graphical user interfaces of the centralized monitoring portal are configured to present to the at least one user one or more estimated capacity usages from across multiple heterogeneous systems associated with the given enterprise.

20. The article of manufacture of claim 15, wherein the one or more graphical user interfaces of the centralized monitoring portal are configured to present to the at least one user monitoring data associated with one or more cloud computing platform services.

\* \* \* \* \*